United States Patent
Lee

(10) Patent No.: US 6,457,465 B2
(45) Date of Patent: Oct. 1, 2002

(54) SYSTEM FOR IDENTIFYING CYLINDER IN ENGINE

(75) Inventor: Choo-Han Lee, Seoul (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 09/751,336

(22) Filed: Dec. 29, 2000

(30) Foreign Application Priority Data

Dec. 30, 1999 (KR) .......................... 1999-66710

(51) Int. Cl.[7] .............................. F02P 5/145; F02P 5/06
(52) U.S. Cl. ................................. 123/643; 73/117.3
(58) Field of Search .......................... 73/116, 117.3; 123/436, 643

(56) References Cited

U.S. PATENT DOCUMENTS

| | | | |
|---|---|---|---|
| 3,972,230 A | * | 8/1976 | Hanson et al. ............... 73/116 |
| 4,870,587 A | * | 9/1989 | Kumagai ....................... 123/643 |
| 5,109,695 A | * | 5/1992 | James et al. .................. 73/116 |
| 5,402,675 A | * | 4/1995 | Entenmann et al. .......... 73/117.3 |
| 5,425,340 A | * | 6/1995 | Petitbon et al. .............. 73/117.3 |
| 5,562,082 A | * | 10/1996 | Norppa et al. ................ 73/116 |
| 5,613,473 A | * | 3/1997 | Angermaier ................. 123/481 |
| 5,756,888 A | * | 5/1998 | Marquez-Escoto ........... 73/116 |
| 5,823,166 A | * | 10/1998 | Entenmann et al. .......... 73/117.3 |
| 5,970,784 A | * | 10/1999 | Genin .......................... 73/117.3 |

\* cited by examiner

*Primary Examiner*—Erick Solis
(74) *Attorney, Agent, or Firm*—Christie, Parker & Hale, LLP

(57) ABSTRACT

Disclosed is a system for identifying a cylinder in an engine comprising means for applying an electric current every time a first cylinder of a 3-cylinder, 4-stroke engine is at a top dead center; means for detecting engine rpm when the electric current is applied; and control means for determining an exhaust stroke when the engine rpm do not increase, and for determining a compression stroke when the engine rpm abruptly increase, and sequentially providing ignition for a second cylinder and a third cylinder to operate the engine.

6 Claims, 3 Drawing Sheets

SYSTEM FOR IDENTIFYING CYLINDER IN ENGINE

CROSS-REFERENCE TO RELATED APPLICATION

This application claims priority of Korea patent Application No. 1999-66710, filed on Dec. 30, 1999.

BACKGROUND OF THE INVENTION (a) Field of the Invention

The present invention relates to a system for identifying a cylinder in an engine, and more particularly, to a system that is able to identify a cylinder in a 3-cylinder, 4-stroke engine without the use of a sensor mounted on a distributor, which is connected to a camshaft.

(b) Description of the Related Art

The identification of a cylinder in an engine is used in controlling ignition timing and is typically performed by sensors. That is, with reference to FIG. 1, there is mounted an internal target wheel 11 of a distributor 10 connected to a crankshaft, and a crank angle sensor 12 for detecting a crank angle and a piston position sensor 13 for detecting a top dead center of a piston are mounted to read the internal target wheel 11. Using outputs of the sensors 12 and 13, identification of the cylinders is possible.

In another system used to identify a cylinder of an engine, with reference to FIG. 2, a target wheel 21 is mounted to a crankshaft 20 and a crank angle sensor 22 for detecting a crank angle is mounted to read the target wheel 21. Also, a target wheel 24 is mounted on a camshaft 23 and a piston position sensor 25 is mounted to read the target wheel 24. Using outputs of the sensors 22 and 25, identification of the cylinders is possible.

With above conventional systems for identifying cylinders in order to control ignition timing, a plurality of sensors are mounted on each crankshaft to detect a cylinder and a crank angle. Accordingly, the engine is made increasingly complex and the amount of space used by the required parts is increased. This decreases productivity and increases the overall costs of the vehicle.

SUMMARY OF THE INVENTION

The present invention has been made in an effort to solve the above problems.

It is an object of the present invention to provide a system in which engine rpm are detected according to whether or not ignition occurs according to the flow of an electric current at a TDC of a first cylinder. Further, the point of an abrupt increase in engine rpm is detected to determine a compression stroke of the first cylinder, thereby enabling the identification of the cylinders without the use of sensors.

To achieve the above object, the present invention provides a system for identifying a cylinder in an engine comprising means for applying an electric current every time a first cylinder of a 3-cylinder, 4-stroke engine is at a top dead center; means for detecting engine rpm when the current is applied; and control means for determining an exhaust stroke when the engine rpm do not increase, and for determining a compression stroke when the engine rpm abruptly increase, and sequentially providing ignition for a second cylinder and a third cylinder to operate the engine.

According to another aspect, the present invention provides a method for identifying a cylinder in an engine, comprising the steps of applying an electric current every time a first cylinder of a 3-cylinder, 4-stroke engine is at a top dead center; detecting engine rpm when the electric current is applied; and determining a type of a stroke of the engine according to the detected engine rpm.

When the engine rpm do not increase, the type of the stroke is determined as an exhaust stroke, and when the engine rpm abruptly increase, the type of the stroke is determined as a compression stroke.

When the type of the stroke is determined as a compression stroke, the method further comprises the step of sequentially providing ignition for a second cylinder and a third cylinder to operate the engine.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
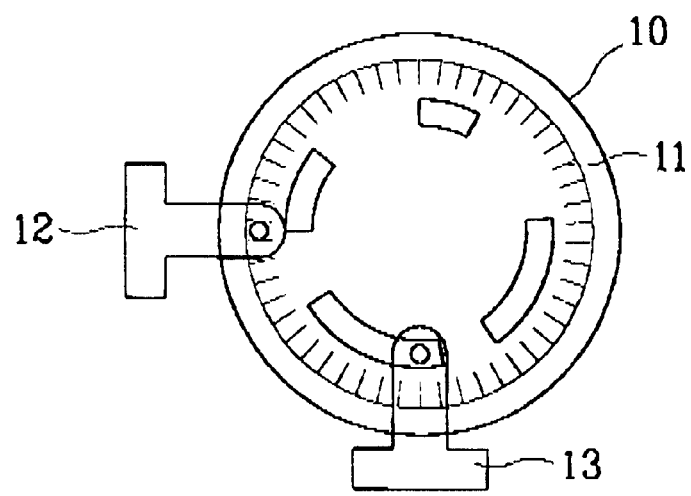
FIG. 1 is an internal front view of a distributor to which there are mounted conventional sensors for identifying a cylinder.
Figure 2:
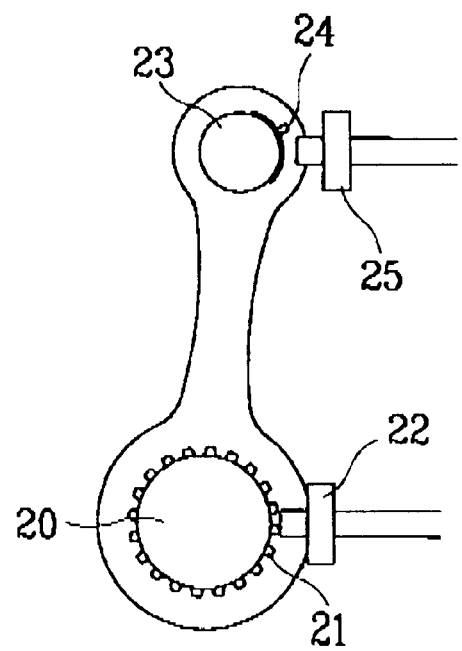
FIG. 2 is a front view of a crankshaft to which there are mounted conventional sensors for identifying a cylinder.
Figure 3:
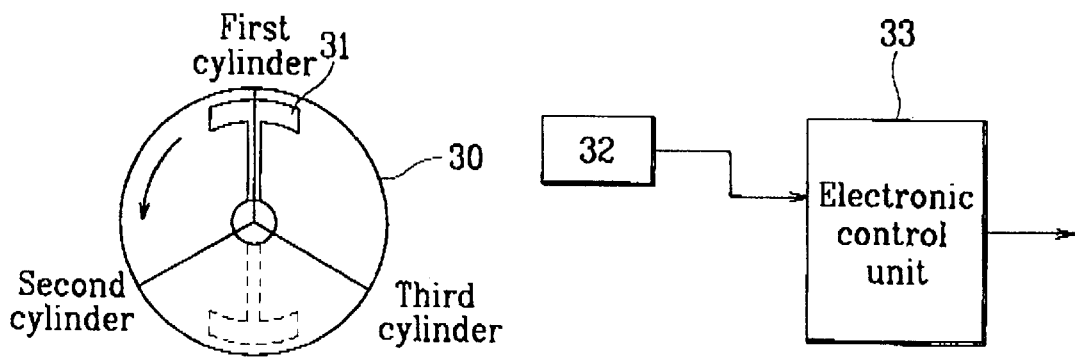
FIG. 3 is a longitudinal sectional view of a system for identifying a cylinder in an engine according to a preferred embodiment of the present invention.

FIG. 3 is a longitudinal sectional view of a system for identifying a cylinder in an engine according to a preferred embodiment of the present invention.

The system includes a distributor 30 for supplying a high-voltage current from a secondary coil of an ignition coil to each cylinder of a 3-cylinder, 4-stroke engine; a rotor 31 rotating together with a terminal, the terminal transmitting the high-voltage current to each cylinder; a sensor 32 for detecting rpm of the rotor 31; and an electronic control unit 33 for identifying a cylinder by output of the sensor 32.

The rotor 31 rotates to be positioned at different locations corresponding to a first cylinder or between the second and third cylinders. When first starting the engine, it can not be known if the first cylinder is at the end of the compression stroke or the end of the exhaust stroke since there is no camshaft sensor. In order to distinguish between the end of the exhaust stroke and end of the compression stroke, a secondary electric power of the ignition coil is applied during each stroke such that if the rotor 31 is at the compression stroke, current flows to ignition plugs to realize ignition, and if at the exhaust stroke, current does not flow to the ignition plugs.

Figure 4:
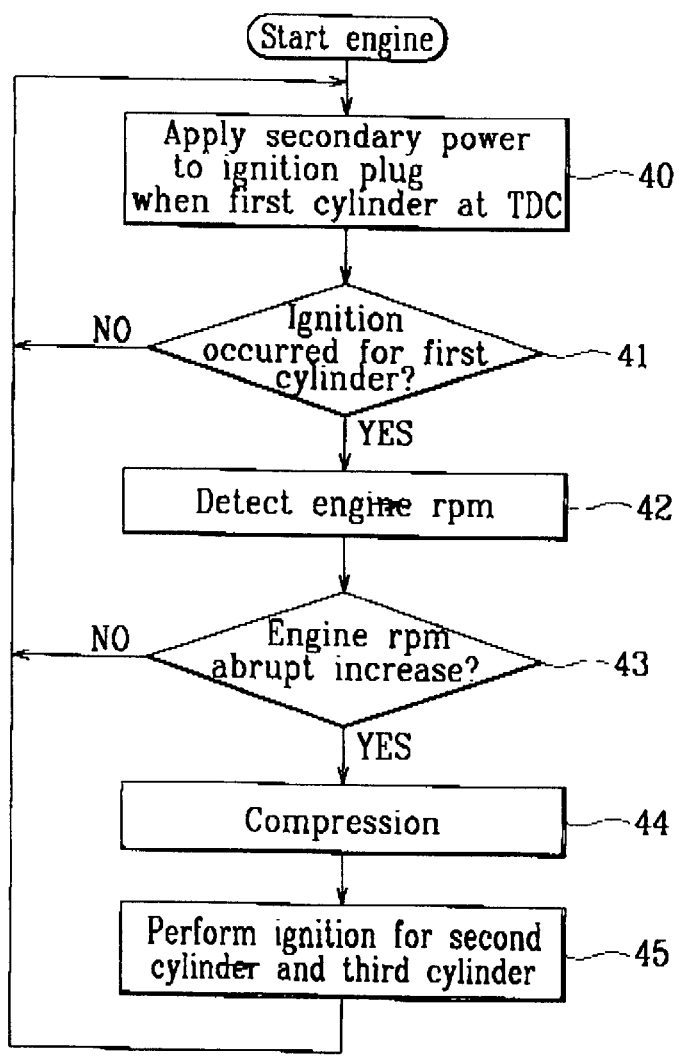
FIG. 4 is a flow chart of operations of the system of FIG. 3.
Figure 5:
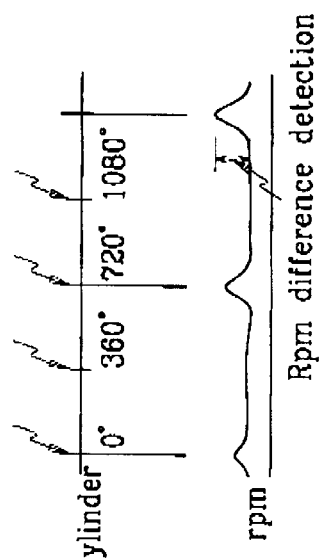
FIG. 5 is a timing chart of the system of FIG. 3.
Figure 5:
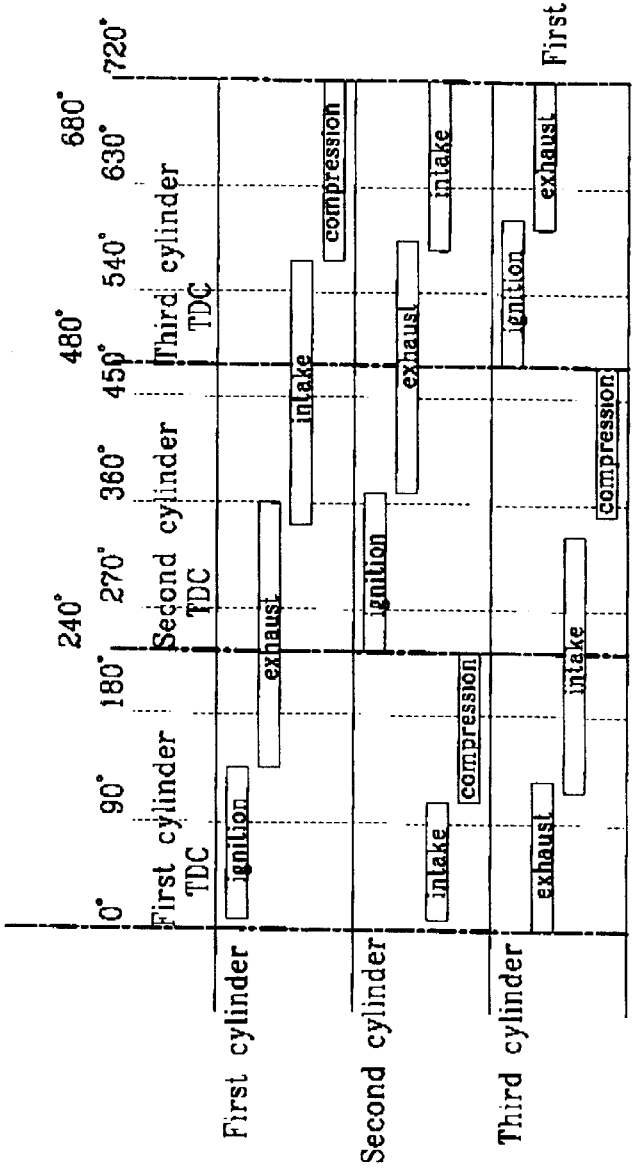

Hence, with reference also to FIGS. 4 and 5, when the first cylinder is at the top dead center (TDC), the secondary electric power of the ignition coil is applied to the ignition coil continuously for every stroke in step S40. At this time, if the rotor 31 is in the compression stroke, ignition is realized, but if the rotor 31 is not in the compression stroke, ignition is not realized. The electronic control unit 33 determines if ignition has occurred for the first cylinder in step S41.

If ignition has not occurred for the first cylinder, the electronic control unit 33 determines that the rotor 31 is in the exhaust stroke, while if ignition has occurred for the first cylinder, the electronic control unit 33 determines that the rotor 31 is in the compression stroke. At this time, engine rpm are detected through the sensor 32 when the first cylinder is at the TDC in step S42.

Subsequently, while engine rpm are being detected, the electronic control unit 33 determines a moment at which engine rpm abruptly increase in step S43. At the moment where engine rpm abruptly increase, the electronic control unit 33 determines that the first cylinder is at the compression stroke in step S44.

Further, starting from the moment where the electronic control unit 33 determines the first cylinder is at the compression stroke, ignition for the second cylinder then for the third cylinder is performed, thereby operating the engine in step S45.

In the present invention described above, engine rpm are detected according to whether or not ignition occurs according to the flow of current at the TDC of the first cylinder. Further, the point of an abrupt increase in engine rpm is detected to determine the compression stroke of the first cylinder, thereby enabling the identification of the cylinders without the use of sensors.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A system for identifying a position of a cylinder in an engine comprising:

means for applying an electric current to a first cylinder of a multi-cylinder, 4-stroke engine every time the first cylinder is at a top dead center;

an electronic control unit determining if ignition has occurred in the first cylinder; and means for detecting engine rpm, wherein the electronic control unit detects an exhaust stroke in the first cylinder when ignition has occurred in the first cylinder and the engine rpm does not increase, and wherein the electronic control unit detects a compression stroke in the first cylinder when ignition has occurred in the first cylinder and the engine rpm abruptly increases, and sequentially providing ignition for a second cylinder and a third cylinder to operate the engine.

2. The system of claim 1 wherein the multi-cylinder engine is a 3-cylinder engine.

3. A method for identifying a position of a cylinder in an engine, comprising the steps of:

applying an electric current to a first cylinder of a multi-cylinder, 4-stroke engine every time the first cylinder is at a top dead center;

determining if ignition has occurred in the first cylinder;

detecting engine rpm when ignition has occurred in the first cylinder; and determining a type of a stroke of the engine according to the detected engine rpm.

4. A method of claim 3 wherein when the engine rpm does not increase, the type of the stroke is determined as an exhaust stroke, and when the engine rpm abruptly increases, the type of the stroke is determined as a compression stroke.

5. A method of claim 4 wherein when the type of the stroke is determined as a compression stroke, the method further comprises the step of sequentially providing ignition for a second cylinder and a third cylinder to operate the engine.

6. The method of claim 3 wherein the multi-cylinder engine is a 3-cylinder engine.

* * * * *